United States Patent Office 2,791,532
Patented May 7, 1957

2,791,532

SOLUBILIZED ADRENOCHROME HEMOSTATIC COMPOSITIONS AND PROCESS OF PRODUCING SAME

Desider Fleischhacker, New York, and Norman Barsel, Laurelton, N. Y., assignors to International Hormones, Inc., Brooklyn, N. Y., a corporation of New York No Drawing. Application December 9, 1953,
Serial No. 397,268

11 Claims. (Cl. 167—65)

The present invention relates to certain novel haemostatic compositions and to a process for the production thereof.

More particularly, the present invention relates to haemostatic compositions comprising a combination of certain adrenochrome derivatives and non-toxic, preferably injectable water soluble salts of 3-hydroxy-2-naphthoic acid and to a process for preparing these compositions.

In our United States Patent No. 2,581,850, issued January 8, 1952, there is disclosed certain combinations of sodium salicylate and adrenochrome derivatives, namely, the semicarbazone and the oxime, which are especially desirable therapeutics for the relief of certain types of bleeding. As pointed out in the aforementioned patent, the combination of at least 25 parts of sodium salicylate to one part of the adrenochrome derivative resulted in stable solutions and/or dry compositions containing high usable concentrations of the mono-semicarbazone or the mono-oxime of adrenochrome. The use of sodium salicylate as a solubilizing agent was thought unique, however, since numerous experiments with chemically analogous materials proved unsuccessful.

In accordance with the present invention, however, the surprising discovery has been made that soluble salts of a particular hydroxy-naphthoic acid and especially the sodium salt of 3-hydroxy-2-naphthoic acid formed, together with adrenochrome derivatives, stable soluble combinations with a relatively low ratio of the aforementioned salt to the adrenochrome derivative. It has further been discovered that the novel compositions of the present invention may be prepared by dissolving the adrenochrome derivatives in a solution of the soluble salts of 3-hydroxy-2-naphthoic acid, such solutions containing at least 1% by weight of the soluble salts and at least six parts by weight of the soluble salt to each part of the adrenochrome derivatives.

Although it is not desired to be limited to this theory, it is believed that the combination of the adrenochrome derivative and the salt of the 3-hydroxy-2-naphthoic acid is in the nature of a complex since mere mixture of the adrenochrome derivative and the salt will not give the same results as a material derived from careful dehydration of a solution of the salt of the 3-hydroxy-2-naphthoic acid and the adrenochrome derivative.

In addition to forming a valuable combination with adrenochrome semicarbazone or the adrenochrome mono-oxime, the soluble salts of 3-hydroxy-2-naphthoic acid will also form a soluble combination with the novel isonicotinic acid hydrazone of adrenochrome of the following formula:

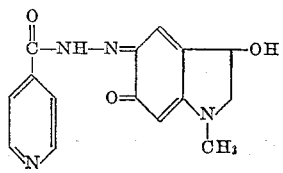

The preparation of this compound by reaction of adrenochrome and isonicotinic acid hydrazide is more completely described in the application of Norman Barsel, Serial No. 397,273, filed as of even date herewith, now Patent No. 2,728,772.

The salts of 3-hydroxy-2-naphthoic acid which have been found useful in accordance with the present invention may be exemplified by the following formula:

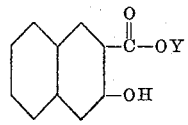

In the above formula, Y preferably represents sodium, although other soluble injectible salts may be utilized, as for example potassium or ammonium so that Y can represent the cations potassium, sodium or ammonium. In general, the salt of the hydroxy-naphthoic acid must be present in the ratio of at least six parts of the hydroxy-naphthoic acid salt to each part of the adrenochrome semicarbazone, the adrenochrome mono-oxime, or the isonicotinic acid hydrazone of adrenochrome.

In preparing the novel composition of the present invention, a solution of the salt of the 3-hydroxy-2-naphthoic acid is first prepared, this solution may be saturated, and such a solution in the case of the sodium salt will contain approximately 8% by weight of the sodium salt. A saturated solution will dissolve up to approximately 12.5 mg. per cc. of the adrenochrome semicarbazone or the adrenochrome mono-oxime and up to 12.5 mg. per cc. of the adrenochrome isonicotinic acid hydrazone. There will, therefore, be present in effective therapeutic solutions or in dry combinations derived therefrom at least six parts by weight of the salt of 3-hydroxy-2-naphthoic acid to each part of the adrenochrome derivative. The solution may be made at room temperature or with slight heating. The solutions may be diluted with water to any degree without precipitation or in the alternative more dilute solutions of the sodium salt or other salts of the 3-hydroxy-2-naphthoic acid may be utilized for dissolving the adrenochrome derivatives: If more dilute solutions of 3-hydroxy-2-naphthoic acid are utilized, a greater proportion of the salt of the 3-hydroxy-2-naphthoic acid must be present in order to dissolve the same quantity of the adrenochrome derivative. In general, it may be stated that solutions below 1% by weight of the salt of the 3-hydroxy-2-naphthoic acid are not suitable or feasible for use since only a very small quantity of the adrenochrome derivative may be dissolved in solutions more dilute than 1%. The solutions may also contain or have added thereto several quantities of substances customarily used in injectable compositions such as up to 2% benzyl alcohol which serves to reduce pain at the injection site.

After the solutions have been made of the adrenochrome derivative and the aforementioned salts they may be evaporated to dryness as by vacuum distillation at temperatures below 50°–60° C., or, preferably, by lyophilizing, i. e., rapid freezing and dehydration in the frozen state under a high vacuum. Still another method found suitable for dehydration of the solutions is rapid spray drying and for this purpose the solutions may be contacted in a conventional spray dryer with hot air at a temperature of approximately 400° F. The resultant powder is thereafter quickly removed from the spray drying chamber which may have a temperature of 200° F.

The solutions may be utilized as such for injection and are especially suitable in the form of aqueous solutions containing for each cc. of solution more than 1 mg. of the adrenochrome mono-semicarbazone, the adrenochrome mono-oxime and/or the adrenochrome isonicotinic acid hydrazone. The dry material may be utilized in the form of tablets, being formed into a tablet together with the usual excipients, fillers and/or adhesives. In any event usable solutions or dry combinations will contain at least six parts by weight of the aforementioned salts of 3-hydroxy-2-naphthoic acid to each part by weight of the adrenochrome derivative.

The following specific examples serve to illustrate but are not intended to limit the present invention:

*Example I*

To 100 cc. of distilled water there was added 8 g. of the sodium salt of 3-hydroxy-2-naphthoic acid. The solution was heated and stirred. To the solution was then added 1.25 g. of adrenochrome semicarbazone. After stirring for a short period of time a clear solution resulted containing for each cc. of solution 12.5 mg. of adrenochrome semicarbazone. The solution was then sterilized and filled into sterile ampules under aseptic conditions. The solution was stable and could be injected in doses of 10 mg. or more of the adrenochrome semicarbazone intermuscularly without producing any necrosis or undesirable side reactions. The composition was particularly effective for the control of capillary type bleeding.

*Example II*

Following the conditions of Example I, a stable solution was prepared containing 12.5 mg. per cc. of adrenochrome mono-oxime instead of the adrenochrome semicarbazone. The combination was similarly effective for the control of bleeding.

*Example III*

The procedure of Example I was repeated except that the solution of the sodium salt of 3-hydroxy-2-naphthoic acid was used to dissolve 1.25 g. of the isonicotinic acid hydrazone of adrenochrome. The result was a stable solution containing for each cc. 12.5 mg. of the hydrazone. The combination was also effective for the control of bleeding without undesirable effects.

*Example IV*

Each of the solutions of Examples I, II and III were quick frozen at a temperature of −10° C. The water content was then driven off at a pressure of 100 microns of mercury and a temperature of −20° C., to form a dry product. The dry products were then formed into tablets by adding thereto the usual excipients and fillers such as milk sugar, starch, etc., so that each tablet contained approximately 1 mg. of the adrenochrome derivative. The tablets proved effective for the control of capillary bleeding. As for example, a normal dose of from 3 to 5 tablets daily was sufficient to control various types of bleeding.

The present application is a continuation in part of our application Serial Number 356,108, filed May 19, 1953, and now abandoned.

We claim:

1. A haemostatic composition comprising at least 6 parts by weight of a non-toxic, water soluble salt of 3-hydroxy-2-naphthoic acid and 1 part by weight of an adrenochrome derivative selected from the group consisting of adrenochrome mono-oxime, adrenochrome mono-semicarbazone and adrenochrome isonicotinic acid hydrazone said composition having water solubility greater than that of the adrenochrome derivatives per se.

2. A haemostatic composition comprising at least 6 parts by weight of a non-toxic, water soluble salt of 3-hydroxy-2-naphthoic acid selected from the class consisting of sodium, potassium and ammonium salts, and 1 part by weight of an adrenochrome derivative selected from the group consisting of adrenochrome mono-oxime, adrenochrome mono-semicarbazone and adrenochrome isonicotinic acid hydrazone said composition having water solubility greater than that of the adrenochrome derivatives per se.

3. A haemostatic composition comprising at least 6 parts by weight of the sodium salt of 3-hydroxy-2-naphthoic acid and one part by weight of adrenochrome mono-oxime said composition having a water solubility greater than that of the adrenochrome mono-oxime per se.

4. A haemostatic composition comprising at least 6 parts by weight of the sodium salt of 3-hydroxy-2-naphthoic acid and one part by weight of adrenochrome mono-semicarbazone said composition having a water solubility greater than that of the mono-semicarbazone per se.

5. A haemostatic composition comprising at least 6 parts by weight of the sodium salt of 3-hydroxy-2-naphthoic acid and one part by weight of adrenochrome isonicotinic acid hydrazone said composition having a water solubility greater than that of the adrenochrome isonicotinic acid hydrazone per se.

6. A haemostatic composition comprising an aqueous solution of at least 6 parts by weight of a non-toxic, water soluble salt of 3-hydroxy-2-naphthoic acid and one part by weight of an adrenochrome derivative selected from the group consisting of adrenochrome mono-oxime, adrenochrome mono-semicarbazone, and adrenochrome isonicotinic acid hydrazone, said solution containing at least 1 mg. per cc. of the adrenochrome derivative.

7. A haemostatic composition comprising an aqueous solution of at least 6 parts by weight of a non-toxic, water soluble salt of 3-hydroxy-2-naphthoic acid selected from the class consisting of sodium, potassium and ammonium salts, and one part by weight of an adrenochrome derivative selected from the group consisting of adrenochrome mono-oxime, adrenochrome mono-semicarbazone and adrenochrome isonicotinic acid hydrazone, said solution containing at least 1 mg. per cc. of the adrenochrome derivative.

8. A haemostatic composition comprising an aqueous solution of at least 6 parts by weight of the sodium salt of 3-hydroxy-2-naphthoic acid and one part by weight of adrenochrome mono-oxime, said solution containing at least 1 mg. per cc. of adrenochrome mono-oxime.

9. A haemostatic composition comprising an aqueous solution of at least 6 parts by weight of the sodium salt of 3-hydroxy-2-naphthoic acid and one part by weight of adrenochrome mono-semicarbazone, said solution containing at least 1 mg. per cc. of adrenochrome mono-semicarbazone.

10. A haemostatic composition comprising an aqueous solution of at least 6 parts by weight of the sodium salt of 3-hydroxy-2-naphthoic acid and one part by weight of adrenochrome isonicotinic acid hydrazone, said solution containing at least 1 mg. per cc. of adrenochrome isonicotinic acid hydrazone.

11. A process for the production of a haemostatic composition comprising at least 6 parts by weight of a non-toxic, water soluble salt of 3-hydroxy-2-naphthoic acid and 1 part by weight of an adrenochrome derivative selected from the group consisting of adrenochrome mono-oxime, adrenochrome mono-semicarbazone and adrenochrome isonicotinic acid hydrazone said composition having water solubility greater than that of the adrenochrome derivatives per se, which comprises preparing an aqueous solution of the salt of 3-hydroxy-2-naphthoic acid having a concentration of at least 1% by weight and dissolving the adrenochrome derivative therein.

(References on following page)

References Cited in the file of this patent

UNITED STATES PATENTS

| | | |
|---|---|---|
| 2,055,083 | Klein | Sept. 22, 1936 |
| 2,581,850 | Fleischhacker | Jan. 8, 1952 |
| 2,601,569 | Suter | June 24, 1952 |

OTHER REFERENCES

Neuberg: "Uber Hydrotropie," Sitzung der physikalisch-mathematischen Klasse, July 27, 1916. Sitzungsberichte der koniglichen preussischen Akademie der Wissenschaften, pp. 1034 to 1042.